(12) United States Patent
Hooker et al.

(10) Patent No.: US 12,402,217 B2
(45) Date of Patent: Aug. 26, 2025

(54) MICROWAVE COOKING APPLIANCE WITH ADAPTIVE THERMAL SENSING CYCLE

(71) Applicant: Midea Group Co., Ltd., Foshan (CN)

(72) Inventors: John Kenneth Hooker, Louisville, KY (US); Adam Baron Jones, Louisville, KY (US); Hieu Manh Vu, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 940 days.

(21) Appl. No.: 16/834,503

(22) Filed: Mar. 30, 2020

(65) Prior Publication Data

US 2021/0307135 A1 Sep. 30, 2021

(51) Int. Cl.
| | |
|---|---|
| *H05B 6/68* | (2006.01) |
| *A23B 2/82* | (2025.01) |
| *A23L 5/10* | (2016.01) |
| *A23L 5/30* | (2016.01) |
| *A47J 36/32* | (2006.01) |
| *A47J 37/06* | (2006.01) |
| *H05B 6/64* | (2006.01) |

(52) U.S. Cl.
CPC ............. *H05B 6/688* (2013.01); *A23B 2/82* (2025.01); *A23L 5/15* (2016.08); *A23L 5/34* (2016.08); *A47J 36/32* (2013.01); *A47J 37/0629* (2013.01); *H05B 6/6411* (2013.01); *H05B 6/6435* (2013.01); *H05B 6/6447* (2013.01); *H05B 6/645* (2013.01); *H05B 6/6455* (2013.01); *H05B 6/681* (2013.01); *H05B 6/686* (2013.01); *A23V 2002/00* (2013.01)

(58) Field of Classification Search
CPC ... A23L 3/365; A23L 5/15; A23L 5/34; A23V 2002/00; A47J 36/32; A47J 37/0629; H05B 6/6411; H05B 6/6435; H05B 6/6447; H05B 6/645; H05B 6/6455; H05B 6/681; H05B 6/686; H05B 6/688
USPC ........................................................ 426/231
See application file for complete search history.

(56) References Cited

U.S. PATENT DOCUMENTS

| | | | |
|---|---|---|---|
| 5,451,751 A | 9/1995 | Takimoto et al. | |
| 5,652,710 A | 7/1997 | Fujii et al. | |
| 5,796,081 A | * 8/1998 | Carlsson .............. | H05B 6/6455 374/149 |

(Continued)

FOREIGN PATENT DOCUMENTS

| | | | |
|---|---|---|---|
| CN | 103512058 A | | 1/2014 |
| CN | 107105130 | * | 8/2017 |

(Continued)

OTHER PUBLICATIONS

KR20190051861A—Translation (Year: 2025).*

(Continued)

*Primary Examiner* — Steven W Crabb
*Assistant Examiner* — Keith Brian Assante
(74) *Attorney, Agent, or Firm* — Gray Ice Higdon

(57) ABSTRACT

A microwave cooking appliance and method for operating the same perform an adaptive thermal sensing cycle in which a temperature sensor is used to develop a temperature profile for food being heated or cooked at an intermediate point in the cycle, such that a duration and output level for a subsequent stage of the cycle may be determined at least in part based upon the temperature profile.

26 Claims, 3 Drawing Sheets

(56) References Cited

U.S. PATENT DOCUMENTS

| | | | |
|---|---|---|---|
| 5,897,207 A | 4/1999 | Hartmann | |
| 6,559,882 B1 | 5/2003 | Kerchner | |
| 7,501,608 B2 | 3/2009 | Hallgren et al. | |
| 8,207,479 B2 * | 6/2012 | Ben-Shmuel | H05B 6/666 219/746 |
| 8,563,059 B2 * | 10/2013 | Luckhardt | F24C 7/08 426/523 |
| 8,839,527 B2 * | 9/2014 | Ben-Shmuel | D06F 58/266 34/260 |
| 9,155,405 B2 * | 10/2015 | Artwohl | G02B 6/0073 |
| 9,215,756 B2 * | 12/2015 | Bilchinsky | H05B 1/02 |
| 10,009,957 B2 | 6/2018 | Pereira et al. | |
| 10,057,946 B2 * | 8/2018 | Mills | H05B 1/0263 |
| 10,219,330 B2 * | 2/2019 | Pereira | H05B 6/6447 |
| 10,271,388 B2 * | 4/2019 | Hallgren | H05B 6/705 |
| 10,687,395 B2 * | 6/2020 | Bilchinsky | H05B 6/664 |
| 11,009,238 B2 * | 5/2021 | Neal | F24D 19/1084 |
| 11,022,322 B2 * | 6/2021 | Clayton | F24C 15/04 |
| 11,058,132 B2 * | 7/2021 | Wang | A47J 27/10 |
| 11,213,158 B2 * | 1/2022 | Baldwin | A23L 5/13 |
| 11,221,145 B2 * | 1/2022 | Bhogal | F24C 3/124 |
| 11,252,792 B2 * | 2/2022 | Seddik | H05B 6/6447 |
| 11,284,742 B2 * | 3/2022 | Grimaldi | H05B 6/6462 |
| 11,388,788 B2 * | 7/2022 | Denker | H05B 6/6441 |
| 2003/0127451 A1 * | 7/2003 | Lile | A47J 37/06 219/506 |
| 2005/0258171 A1 * | 11/2005 | Witt | H05B 6/6482 219/685 |
| 2005/0265423 A1 | 12/2005 | Mahowald et al. | |
| 2009/0236334 A1 * | 9/2009 | Ben-Shmuel | H05B 6/688 219/703 |
| 2009/0236335 A1 * | 9/2009 | Ben-Shmuel | B65D 81/3453 219/710 |
| 2010/0115785 A1 * | 5/2010 | Ben-Shmuel | H05B 6/72 34/260 |
| 2010/0176123 A1 * | 7/2010 | Mihara | H05B 6/705 219/746 |
| 2014/0203012 A1 * | 7/2014 | Corona | A23L 5/15 219/704 |
| 2014/0318388 A1 * | 10/2014 | Kim | A47J 37/0641 99/447 |
| 2015/0289324 A1 * | 10/2015 | Rober | H05B 6/668 219/707 |
| 2015/0379905 A1 * | 12/2015 | Kawasaki-Hedges | G09F 19/16 40/427 |
| 2016/0029441 A1 * | 1/2016 | Taylor | H05B 6/645 219/745 |
| 2016/0192446 A1 * | 6/2016 | Seddik | H05B 6/6464 219/705 |
| 2016/0217417 A1 * | 7/2016 | Ma | G06V 20/52 |
| 2016/0345390 A1 * | 11/2016 | Corona | H05B 6/687 |
| 2017/0280515 A1 | 9/2017 | Imai et al. | |
| 2017/0323481 A1 * | 11/2017 | Tran | H04N 5/23219 |
| 2018/0220500 A1 * | 8/2018 | Staton | H05B 6/6447 |
| 2019/0014625 A1 * | 1/2019 | Matsui | H05B 6/668 |
| 2019/0230749 A1 * | 7/2019 | Leindecker | H05B 6/686 |
| 2019/0234617 A1 * | 8/2019 | Bhogal | F24C 7/085 |
| 2020/0085082 A1 * | 3/2020 | Tran | H05B 6/1245 |
| 2020/0205247 A1 * | 6/2020 | Scott | H05B 6/686 |
| 2020/0397177 A1 | 12/2020 | Walsh et al. | |
| 2021/0360753 A1 * | 11/2021 | Hua | H05B 6/62 |
| 2022/0039219 A1 | 2/2022 | Givens et al. | |
| 2022/0061134 A1 * | 2/2022 | Chun | F26B 3/30 |
| 2024/0114603 A1 * | 4/2024 | Hooker | H05B 6/782 |

FOREIGN PATENT DOCUMENTS

| | | | | |
|---|---|---|---|---|
| CN | 207751025 U | | 8/2018 | |
| EP | 0467625 A2 | | 1/1992 | |
| EP | 0781072 | * | 12/1996 | |
| EP | 1028604 | * | 8/2000 | |
| EP | 2528415 | * | 11/2012 | |
| EP | 2127482 | * | 4/2014 | |
| EP | 3672365 A1 | * | 6/2020 | A23L 3/365 |
| JP | 2001165443 | * | 6/2001 | |
| JP | 5064924 | * | 10/2012 | |
| JP | 2014109421 | * | 6/2014 | |
| JP | 2020518780 | * | 6/2020 | |
| KR | 20150049026 A | | 5/2015 | |
| KR | 20190051861 | * | 6/2019 | F25D 23/12 |
| WO | WO-2015196218 A1 | * | 12/2015 | G05B 15/02 |
| WO | WO2018077722 | * | 5/2018 | |
| WO | WO2019052929 A1 | | 3/2019 | |
| WO | WO2019101528 A1 | | 5/2019 | |
| WO | WO2019218685 A1 | | 11/2019 | |
| WO | WO2020/128025 | * | 6/2020 | |
| WO | 2022046862 A1 | | 3/2022 | |

OTHER PUBLICATIONS

Khan, Tareq, Towards an Autonomous Temperature Feedback Microwave Oven with Thermal Imaging, IEEE, 2018.

Khan, Tareq, Smart Microwave Oven with Image Classification and Temperature Recommendation Algorithm, 2018 Institute of Advanced Engineering and Science, 2018.

Johnsen, Stuart et al., Microwave Oven with a Thermal Camera: Solving the Cold Spot Problem, 2015.

Liyan, Cui et al., Temperature Monitoring Based on Image Processing for Intelligent Microwave Heating, 27th Chinese Control and Decision Conference, IEEE, 2015.

Khan, Tareq, An Intelligent Microwave Oven with Thermal Imaging and Temperature Recommendation Using Deep Learning, MDPI Journal, 17 pages, dated Dec. 23, 2019.

Related Applications Transmittal dated Nov. 9, 2022.

* cited by examiner

MICROWAVE COOKING APPLIANCE WITH ADAPTIVE THERMAL SENSING CYCLE

BACKGROUND

Microwave cooking appliances are commonly used for residential cooking, and operate by heating and cooking food through the generation of electromagnetic radiation within a specific range of frequencies (referred to herein as microwave radiation) that causes water, fat and other substances in food to absorb energy via dielectric heating. Microwave cooking is relatively uniform and quick, although due to the sometimes uneven distribution of microwave radiation in a cooking cavity, many microwave cooking appliances incorporate turntables that rotate the food to more evenly expose the food to the microwave radiation.

Microwave cooking appliances generally incorporate a microwave power generator for generating the microwave radiation, which may include a power supply and a magnetron that is driven by the power supply to generate the microwave radiation. Many microwave cooking appliances also incorporate multiple output levels to control the rate of heating or cooking of food. Some designs utilize a fixed microwave power generator that outputs a constant output power of microwave radiation, and that is cycled on and off every few seconds in order to support the multiple output levels, while other designs utilize a variable microwave power generator that incorporates an inverter power supply to provide relatively continuous heating at multiple output levels.

Some types of cooking or heating cycles and/or types of food present challenges to conventional microwave cooking appliances. One such type of cycle is a defrost cycle, in which frozen food is desirably heated at a rate sufficient to thaw the food, but without actually cooking the food (the food is usually cooked in another appliance once defrosted). Due to differences in food thicknesses and compositions, however, many conventional microwave cooking appliances may apply too much heating to some areas of the food, potentially altering the characteristics of those areas of the food and decreasing the quality of the food once it has been cooked. Conventional defrost cycles attempt to address this problem by prompting a user to input information about the food being defrosted, e.g., its weight, and then selecting an output level and duration for the defrost cycle based upon the input. Due to variations in food characteristics (e.g., water content and thickness), as well as how deeply the food is frozen (e.g., right out of the freezer, or already partially thawed), however, the defrost cycles often are incapable of properly defrosting many foods.

Accordingly, a need continues to exist in the art for a manner of controlling a microwave cooking appliance to more reliably performing defrost and other types of challenging cycles.

SUMMARY

The herein-described embodiments address these and other problems associated with the art by providing a microwave cooking appliance and method for operating the same to perform an adaptive thermal sensing cycle in which a temperature sensor is used to develop a temperature profile for food being heated or cooked at one or more point in the cycle such that a duration and output level for a subsequent stage of the cycle may be determined at least in part based upon the temperature profile.

Therefore, consistent with one aspect of the invention, a microwave cooking appliance may include an enclosure including a cooking cavity configured to receive food, a microwave power generator configured to generate microwave energy for heating the food received in the cooking cavity, a temperature sensor configured to sense temperature within the cooking cavity, and a controller coupled to the microwave power generator and the temperature sensor and configured to perform a cycle to heat the food received in the cooking cavity. The controller may be configured to perform a first stage of the cycle by controlling the microwave power generator to heat the food, determine a temperature profile of the food using the temperature sensor after the first stage of the cycle is complete and while the microwave power generator is deenergized, if the temperature profile meets a completion criterion for the cycle, terminate the cycle, and if the temperature profile fails to meet the completion criterion for the cycle, perform a second stage of the cycle by determining a duration for the second stage and an output level for the microwave power generator during the second stage and controlling the microwave power generator to heat the food at the determined output level and for the determined duration.

In some embodiments, the cycle is a defrost cycle. Also, in some embodiments, the cycle is an auto-defrost cycle, and the controller is configured to initiate the auto-defrost cycle in response to selection of an auto-defrost control. Further, in some embodiments, the controller is further configured to receive user input of a food weight, and in response to the user input, control at least one of a power level and a duration of the first stage of the cycle based in part on the user input.

In some embodiments, the microwave power generator is a variable power microwave power generator, and the controller is configured to control the microwave power generator to heat the food at the determined output level by varying an output power of the microwave power generator. In addition, in some embodiments, the microwave power generator is a fixed power microwave power generator, and the controller is configured to control the microwave power generator to heat the food at the determined output level by cycling the microwave power generator.

In some embodiments, the temperature sensor includes a non-contact infrared thermal sensor. In addition, in some embodiments, the temperature sensor includes a thermal camera configured to generate a thermal image having an array of temperature readings over a field of view thereof. Moreover, in some embodiments, the controller is further configured to determine an initial temperature profile of the food using the temperature sensor prior to initiating the first stage. In some embodiments, the initial temperature profile includes a thermal image including an array of temperature readings over a field of view thereof, and the controller is configured to determine a size of the food by applying a threshold to the array of temperature readings.

Further, in some embodiments, the initial temperature profile incudes a first thermal image including a first array of temperature readings over a field of view thereof, and the controller is configured to determine a size of the food by determining a knee point from the first array of temperature readings, determining a first set of food temperature readings from among the first array of temperature readings based upon the determined knee point, expanding the first set of food temperature readings to include one or more adjacent temperature readings from the first array of temperature readings, determining a temperature threshold from the expanded first set of food temperature readings, capturing a second thermal image including a second array of temperature readings, and determining a second set of food temperature readings from among the second array of temperature readings based upon the determined temperature threshold. Moreover, in some embodiments, the controller is configured to determine a duration for the first stage and an output level for the microwave power generator during the first stage based at least in part on the initial temperature profile.

Some embodiments may also include a rotatable turntable, and at least one of the duration of the first stage and the duration of the second stage is based upon a number of turntable rotations. In some embodiments, the controller is configured to determine the temperature profile of the food using the temperature sensor by sensing a temperature at a plurality of sensing intervals while the microwave power generator is deenergized. In addition, in some embodiments, the controller is configured to sense the temperature at the plurality of sensing intervals until a temperature of the food stabilizes. In some embodiments, the controller is configured to determine when the temperature of the food stabilizes by determining when a rate of change of the temperature meets a threshold. Moreover, in some embodiments, the controller is configured to sense the temperature at the plurality of sensing intervals until a temperature of the food is even across a surface of the food. Also, in some embodiments, the controller is configured to determine when the temperature of the food is even across the surface of the food by determining when a standard deviation of a plurality of temperature measurements across the surface of the food meets a threshold. In some embodiments, the controller is configured to determine that the temperature profile meets the completion criterion for the cycle when a temperature of the food reaches a threshold temperature.

In addition, in some embodiments, the controller is further configured to estimate a remaining duration of the cycle based at least in part on the temperature profile and report the remaining duration to a user. Also, in some embodiments, the controller is configured to estimate a remaining duration of the cycle by determining a water mass of the food based at least in part on the temperature profile and an initial temperature profile determined using the temperature sensor and prior to initiating the first stage.

Consistent with another aspect of the invention, a microwave cooking appliance may include an enclosure including a cooking cavity configured to receive food, a microwave power generator configured to generate microwave energy for heating the food received in the cooking cavity, a temperature sensor configured to sense temperature within the cooking cavity, and a controller coupled to the microwave power generator and the temperature sensor and configured to perform a defrost cycle to defrost the food received in the cooking cavity. The controller may be configured to determine a first temperature profile of the food using the temperature sensor, perform a first stage of the defrost cycle after determining the first temperature profile by controlling the microwave power generator to heat the food, determine a second temperature profile of the food using the temperature sensor after the first stage of the defrost cycle is complete, estimate a remaining duration of the defrost cycle based at least in part on the first and second temperature profiles, and report the remaining duration to a user.

Moreover, in some embodiments, the controller is configured to estimate the remaining duration of the defrost cycle based at least in part on the first and second temperature profiles by determining a water mass of the food based at least in part on the first and second temperature profiles. Further, in some embodiments, the controller is configured to perform a second stage of the defrost cycle by determining a duration for the second stage and an output level for the microwave power generator during the second stage and controlling the microwave power generator to heat the food at the determined output level and for the determined duration. Also, in some embodiments, the controller is configured to determine a duration for the first stage and an output level for the microwave power generator during the first stage based at least in part on the first temperature profile.

Consistent with another aspect of the invention, a method of performing a cycle to heat food disposed in a cooking cavity of a microwave cooking appliance may include performing a first stage of the cycle by controlling a microwave power generator to generate microwave energy to heat the food, determining a temperature profile of the food using a temperature sensor configured to sense temperature within the cooking cavity after the first stage of the cycle is complete and while the microwave power generator is deenergized, if the temperature profile meets a completion criterion for the cycle, terminating the cycle, and if the temperature profile fails to meet the completion criterion for the cycle, performing a second stage of the cycle by determining a duration for the second stage and an output level for the microwave power generator during the second stage and controlling the microwave power generator to heat the food at the determined output level and for the determined duration.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
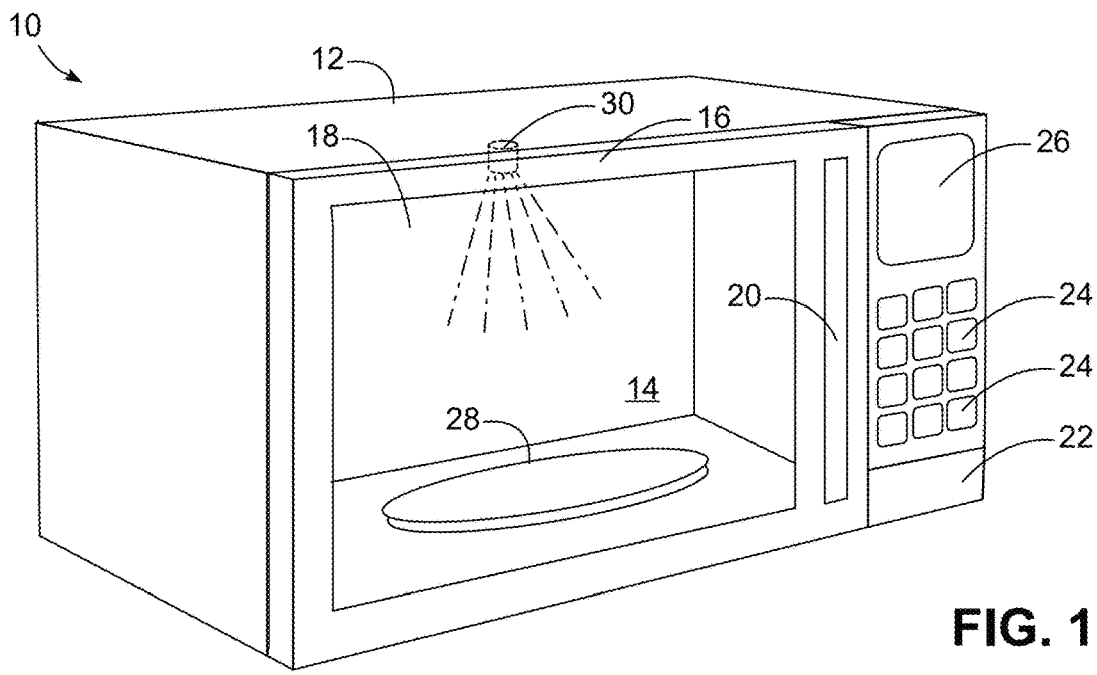
FIG. 1 is a perspective view of a microwave cooking appliance consistent with some embodiments of the invention.

Turning now to the drawings, wherein like numbers denote like parts throughout the several views, FIG. 1 illustrates an example microwave cooking appliance 10 in which the various technologies and techniques described herein may be implemented. Microwave cooking appliance 10 is a residential-type microwave cooking appliance, and as such includes a housing or enclosure 12, which further includes a cooking cavity 14, as well as a door 16 disposed adjacent the respective opening of the cooking cavity 14. In some embodiments, the door 16 may further include a window 18 that allows a user to view the items inside the cooking cavity 14 and a handle 20. In other embodiments, in place of, or in addition, to the handle 20, the microwave cooking appliance 10 may include a button 22 that a user may press to trigger the opening of the door 16.

The microwave cooking appliance 10 may also include one or more user activated controls 24, which may be in the form of buttons, knobs, a touchscreen, or the like. In some embodiments, these user activated controls 24 may be used to program a cooking time and/or a cooking power level. In addition, in some embodiments, these user activated controls 24 may be used to selected one or more preset conditions for a particular food item to be cooked or a particular desired action (e.g. "popcorn", "defrost", "frozen pizza", etc.). In some embodiments, the preset conditions may include one or more adaptive thermal sensing cycles such as an auto-defrost or auto-cook cycle, which are described in greater detailed herein. The microwave cooking appliance 10 may also include a display 26, which may be used to convey a variety of information to a user. For example, in some embodiments, the display 26 may be used to display the time when the microwave cooking appliance 10 is not in use. In other embodiments, the display 26 may be used to display cooking times, power levels and/or temperatures.

Microwave cooking appliance 10 may also include a rotatable turntable 28 that is configured to support food to be cooked, e.g., disposed in a container or on a plate. In some embodiments, the turntable 28 may be positioned centrally in the cooking cavity 14, although this is not intended to be limiting. One or more food items may be placed on turntable 28, so that as the turntable rotates so do the one or more food items contained thereon. This rotation may facilitate more even heating (or cooking) of the food item(s). In some instances, such a turntable may be configured to be turned on, off, or otherwise controlled (e.g. rotational speed) in response to various user inputs.

In addition, microwave cooking appliance 10 also includes a temperature sensor 30, which in the illustrated embodiments may be used to sense one or more temperatures in cooking cavity 14, and in some instances, develop a temperature profile for food disposed in cooking cavity 14. In some instances, a temperature sensor may be a non-contact temperature sensor (e.g., an infrared (IR) thermal sensor) disposed on or within a top wall of cavity 14 as illustrated in FIG. 1, with a field of view directed downwardly and thus towards a top surface of any food disposed in the cooking cavity. Other positions, e.g., on a sidewall or in a corner of cooking cavity 14, may also be used in other embodiments. In some embodiments, other types of temperature sensors may be used, including temperature probes and other types of contact temperature sensors that require direct contact with the food.

As will become more apparent below, however, in many embodiments it may be desirable to implement temperature sensor 30 using one or more thermal cameras, also referred to as thermal imaging devices, capable of generating thermal images or scans having two or three dimensional arrays of temperature readings over field of views thereof. A thermal camera may include an array of thermal sensors capable of detecting various infrared wavelengths, e.g., infrared waves, far-infrared waves, long wave infrared waves, within a field of view of the thermal camera. An example thermal image generated by a thermal camera includes 768 data values distributed in a 32×24 two dimensional array representing the field of view of the thermal camera. Other thermal cameras may be used in other embodiments.

Figure 2:
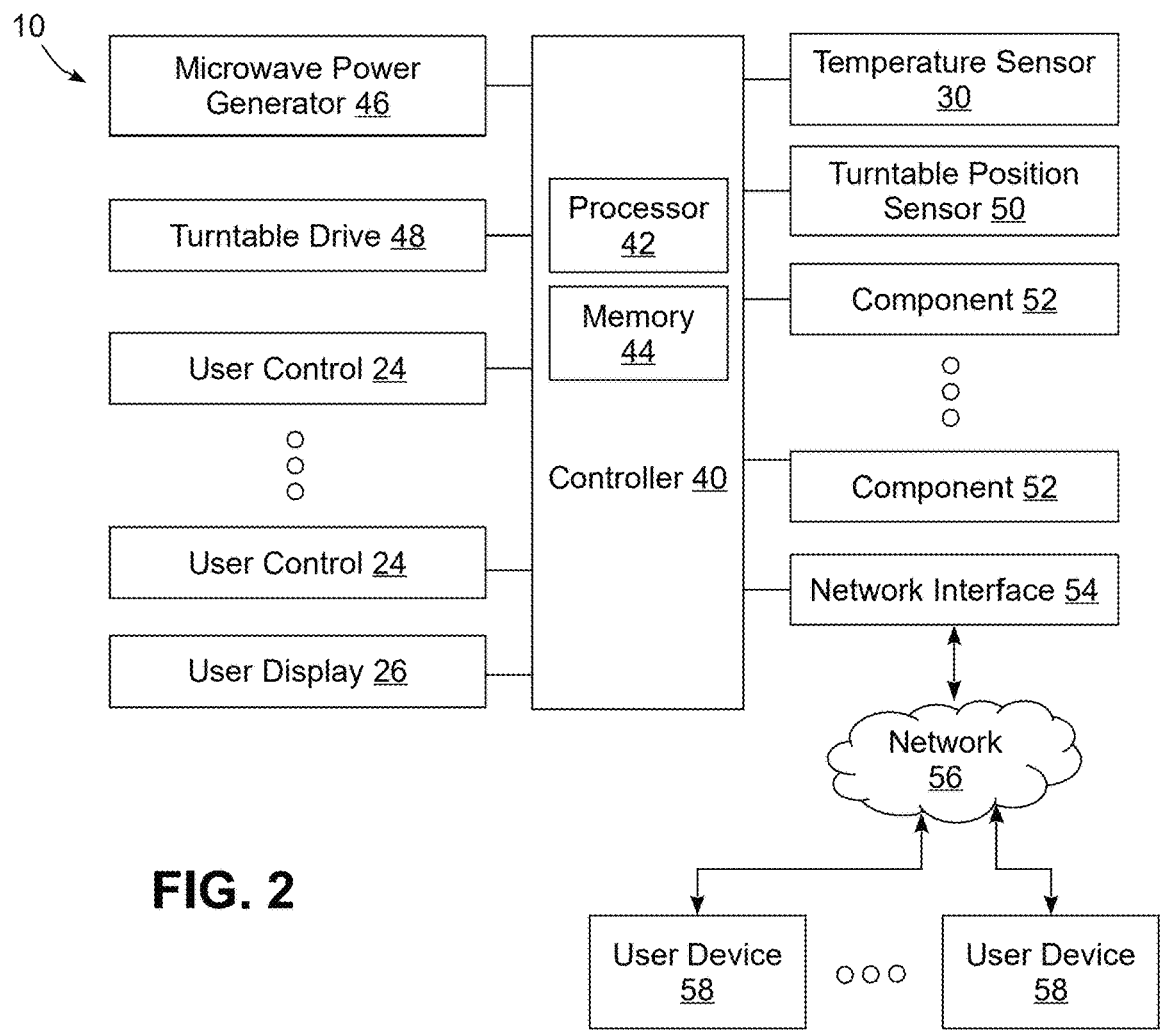
FIG. 2 is a block diagram of an example control system for the microwave cooking appliance of FIG. 1.

A microwave cooking appliance consistent with the invention also generally includes one or more controllers configured to control the application of cooking energy to food disposed in the appliance, and otherwise perform various cooking or heating cycles at the direction of a user. FIG. 2, for example, illustrates an example embodiment of a controller 40 for microwave cooking appliance 10 that receives inputs from a number of components and drives a number of components in response thereto. Controller 40 may, for example, include one or more processors 42 and a memory 44 within which may be stored program code for execution by the one or more processors. The memory may be embedded in controller 40, but may also be considered to include volatile and/or non-volatile memories, cache memories, flash memories, programmable read-only memories, read-only memories, etc., as well as memory storage physically located elsewhere from controller 40, e.g., in a mass storage device or on a remote computer interfaced with controller 40.

As shown in FIG. 2, controller 40 may be interfaced with various components, including the aforementioned user controls 24 for receiving user input (which may be implemented in various embodiments using various combinations of switches, knobs, buttons, sliders, touchscreens or touch-sensitive displays, microphones or audio input devices, image capture devices, etc.), user display 26 (which may be implemented in various embodiments using various indicators, graphical displays, textual displays, speakers, etc.), and temperature sensor 30. Further, as illustrated in FIG. 2, controller 40 may be interfaced with a microwave power generator 46, which may include a power supply and a magnetron, and which in some embodiments may be implemented as a fixed power microwave power generator that is cycled in order to provide different output levels, and in other embodiments may be implemented as a variable power microwave power generator that utilizes an inverter power supply that varies an output power of the microwave power generator in order to provide different output levels.

In addition, in some embodiments controller 40 may be interfaced with a turntable drive 48 and a turntable position sensor 50, the former of which is used to rotate the turntable, and the latter of which is used to sense a rotational position of the turntable. Sensor 50 in some embodiments may be capable of sensing multiple rotational positions of the turntable (e.g., utilizing an encoder or multiple position detectors), while in other embodiments, sensor 50 may be capable of sensing a single rotational position (e.g., a home position) to enable the turntable to be stopped at the same position every time (e.g., when attempting to capture thermal scans of the turntable with the food thereon at the same rotational orientation). In other embodiments, a camera, or even temperature sensor 30, may be used to sense the rotational position of the turntable. Further, in some embodiments no separate sensor 50 may be used, e.g., where the rotational rate of the turntable is known, such that the turntable may be stopped approximately at a particular position based upon a timer (e.g., with a rotational rate of X seconds per revolution, stopping the turntable after X seconds would correspond to a full rotation of the turntable).

Controller 40 may also be interfaced with various additional components 52 suitable for use in a microwave cooking appliance, e.g., lights, fans, indicators, door switches, etc., among others. In addition, in some embodiments, microwave cooking appliance 10 may be a "smart" appliance with network connectivity, and controller 40 may be coupled to one or more network interfaces 54, e.g., for interfacing with external devices via wired and/or wireless networks such as Ethernet, Wi-Fi, Bluetooth, NFC, optical, cellular and other suitable networks, collectively represented in FIG. 2 at 56. Network 56 may incorporate in some embodiments a home automation network, and various communication protocols may be supported, including various types of home automation communication protocols. In some embodiments, microwave cooking appliance 10 may also be interfaced with one or more user devices 58 over network 56, e.g., computers, laptops, tablets, smart phones, wearable devices, personal digital assistants, automated assistants, etc., and through which microwave cooking appliance 10 may be controlled and/or microwave cooking appliance 10 may provide user feedback.

In some embodiments, controller 40 may operate under the control of an operating system and may execute or otherwise rely upon various computer software applications, components, programs, objects, modules, data structures, etc. In addition, controller 40 may also incorporate hardware logic to implement some or all of the functionality disclosed herein. Further, in some embodiments, the sequences of operations performed by controller 40 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

Numerous variations and modifications to the microwave cooking appliance illustrated in FIGS. 1-2 will be apparent to one of ordinary skill in the art, as will become apparent from the description below. Therefore, the invention is not limited to the specific implementations discussed herein.

Embodiments consistent with the invention, as mentioned above, are directed in part to a microwave cooking appliance and method for operating the same to perform an adaptive thermal sensing cycle in which a temperature sensor is used to develop a temperature profile for food being heated or cooked at an intermediate point in the cycle, such that a duration and output level for a subsequent stage of the cycle may be determined at least in part based upon the temperature profile. Specifically, in some embodiments of the invention, a microwave cooking appliance controller may be configured to perform a cycle to heat food received in a cooking cavity of the microwave cooking appliance by controlling a microwave power generator to heat the food during a first or initial stage of the cycle, determining a temperature profile of the food using a temperature sensor after the first or initial stage of the cycle is complete and while the microwave power generator is deenergized and then, based upon whether that temperature profile is determined to meet a completion criterion for the cycle, either terminating the cycle or performing a second or subsequent stage of the cycle by determining a duration for the second stage and an output level for the microwave power generator during the second stage and controlling the microwave power generator to heat the food at the determined output level and for the determined duration.

An adaptive thermal sensing cycle may be considered to represent an operational cycle that is performed to heat or cook food in a microwave cooking appliance, and that is at least in part adaptive in terms of output level and/or duration based at least in part upon one or more temperature profiles collected before and/or during the cycle by a temperature sensor. The discussion hereinafter will focus on an adaptive thermal sensing cycle configured to defrost food, also referred to herein as an auto-defrost cycle, although the invention is not so limited, and other heating or cooking cycles may incorporate the herein-described techniques as will be appreciated by one of ordinary skill in the art having the benefit of the instant disclosure.

A temperature profile, in this regard, may be considered to represent a collection of temperature-related data regarding food being heated or cooked within a microwave cooking appliance. A temperature profile in some instances may include only raw data in some instances, e.g., one or more temperature readings collected for the food, while in other instances, the temperature profile may include derived data such as calculations of averages, means, standard deviations, minimums, maximums, etc. Further, while in some instances a temperature profile may be based upon data captured at a single point in time, in other instances a temperature profile may include data that is captured at multiple points in time and/or derived from data captured at multiple points in time (e.g., rates of change).

In addition, in some embodiments, a microwave cooking appliance and method for operating the same may automatically estimate and report to a user a remaining duration for a defrost cycle performed by the microwave cooking appliance based upon a comparison of two temperature profiles captured at different times by a temperature sensor. In particular, in some embodiments, a microwave cooking appliance controller may be configured to perform a defrost cycle to defrost food received in a cooking cavity of the microwave cooking appliance by determining a first temperature profile of the food using a temperature sensor, performing a first stage of the defrost cycle after determining the first temperature profile, determining a second temperature profile of the food using the temperature sensor after the first stage of the defrost cycle is complete, estimating a remaining duration of the defrost cycle based at least in part on the first and second temperature profiles, and then reporting the remaining duration to a user.

Figure 3:
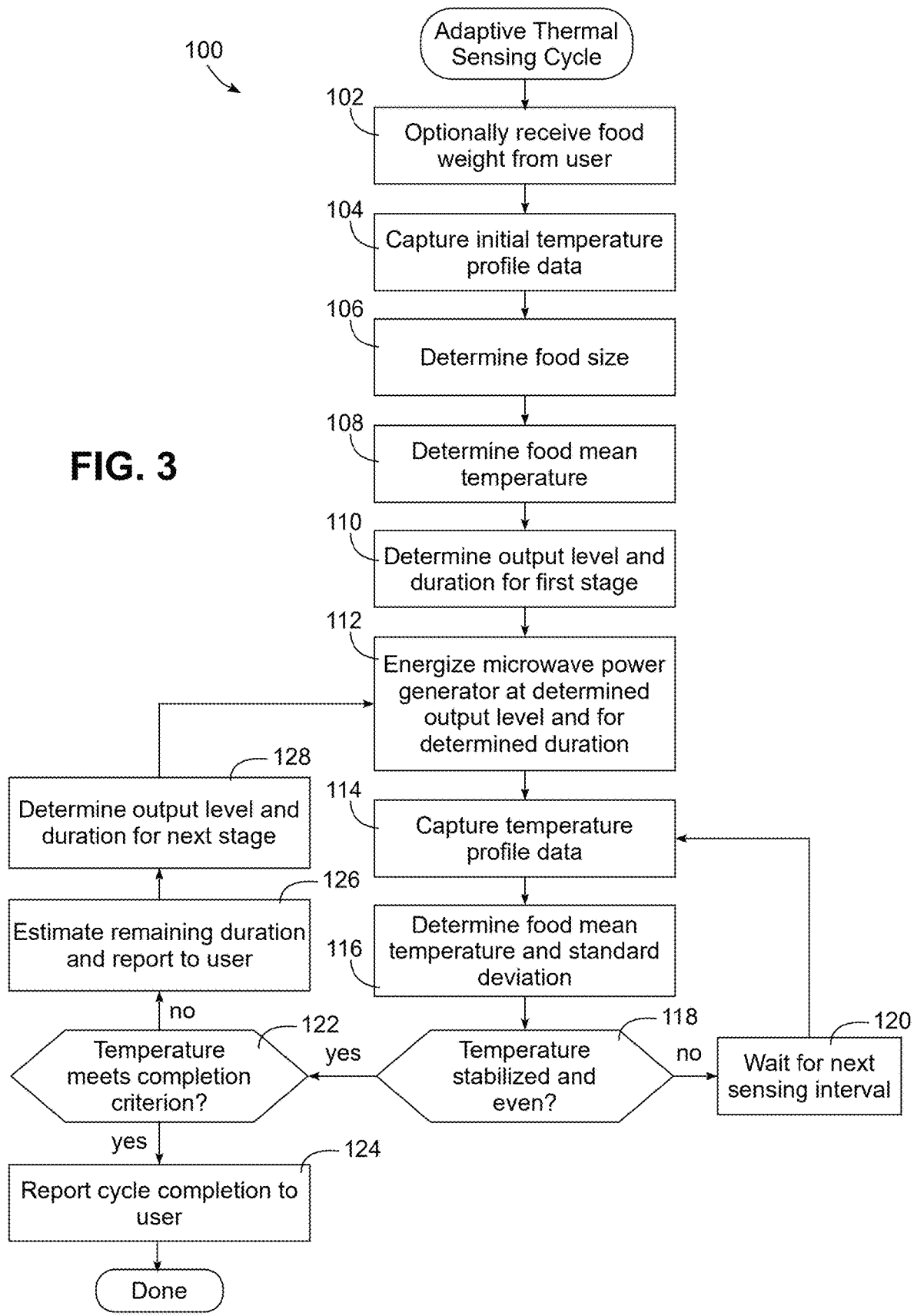
FIG. 3 is a flowchart illustrating an example sequence of operations for performing an adaptive thermal sensing cycle in the microwave cooking appliance of FIGS. 1-2.

Now turning to FIG. 3, this figure illustrates a sequence of operations 100 for performing an adaptive thermal sensing cycle, and in particular, an auto-defrost cycle, in the microwave cooking appliance illustrated in FIGS. 1 and 2. Sequence 100 may be initiated, for example, subsequent to a user placing frozen food item(s) on the turntable, closing the door, and pressing an appropriate user control (e.g., an "Auto-Defrost" cycle start button. In some instances, a "defrost in progress" message may be reported to the user, e.g., via a display or audio announcement.

In some embodiments, it may also be desirable, as illustrated in block 102, to optionally receive a food weight from the user, e.g., via input of a numerical weight in pounds, ounces, grams, etc. via the user controls. In other instances, a weight sensor may be used to automatically determine the weight of the food, while in other instances no weight may be determined. In addition, in some embodiments, the user may optionally receive a food type (e.g. burger patties, ground beef, chicken breasts, etc.), which may be used in combination with or in lieu of the food weight to further optimize the auto-defrost cycle.

Then, as illustrated in block 104, initial temperature profile data is collected using the temperature sensor. For the initial temperature profile, for example, a thermal image may be collected, e.g., including a 32×24 array of temperature readings across the field of view for a thermal camera implementation of the temperature sensor.

Next, in block 106, size information about the food is determined, in part based upon the data collected in block 104. For example, in some embodiments a threshold may be applied against all of the temperature readings to determine which temperature readings are measuring the food to be defrosted and which are not. The interior of the microwave cooking appliance, including the turntable, as well as any plate or other container supporting the food, may be assumed to be near room temperature (e.g., about 20-25 degrees Celsius), and while the surface of the food to be defrosted may have a surface temperature higher than that of the interior of the food, the surface will still generally be close to freezing as the water goes through phase change at 0 degrees Celsius, so a threshold between fully frozen (about -20 degrees Celsius) and about 0 degrees Celsius may be used in some embodiments.

Size information, in some embodiments, may also be complicated by the fact that the starting surface food temperature (which is generally what is measured using an infrared-type temperature sensor) can be over a very wide range depending on how long the food has been out of the freezer (since thawing generally starts at the surface of the food). As such, in one example embodiment, size information may be determined using the following algorithm. In this example embodiment, a thermal image including 768 data values distributed in a 32×24 two dimensional array is assumed:

1. Capture 768 pixels of temperature readings.
2. Sort pixels in increasing order array referred to as TempsArray.
3. Find the average of 3 points in a row of TempsArray (referred to as ThreeAvg array, and which has 766 members).
4. Find the difference of the consecutive points in the ThreeAvg array (referred to as ThreeAvg1d, and which has 765 members).
5. Find the average of 5 points in a row of TempsArray (referred to as FiveAvg array, and which has 764 members).
6. Find the difference of the consecutive points in the FiveAvg array (referred to as FiveAvg1d, and which has 763 members).
7. Determine a knee point, which has the highest temperature readings among the pixels that are purely food, based upon satisfying at least one of the following two conditions: (a) the member that has both ThreeAvg1d and FiveAvg1d above about 0.1, or (b) the member that has FiveAvg1d above about 0.1 while at least two previous members have ThreeAvg1d above about 0.1 but not below about 0.09.
8. Repeat steps 1-7 until consecutive knee points are found to be within 5 pixels of each other, i.e., until the knee point determined in iteration X is within 5 pixels of iteration X-1.
9. Once the knee point is determined, every pixel that has a temperature reading that is less than knee point's reading is counted as a food pixel.
10. These readings are then arranged in a two-dimensional array that has a width of 24 and a length of 32.
11. Expand two pixels away from the perimeter of all food pixel clusters and count them as food pixels if they satisfy both of the following requirements: (a) the temperature difference with any neighboring food pixel doesn't exceed about 6 degrees Celsius, and (b) the temperature reading doesn't exceed about 10 degrees Celsius.
12. Once the new food pixels are acquired, determine the maximum temperature reading among them (referred to as the temperature threshold).
13. If the temperature threshold is less than about -1 degrees Celsius, then choose -1 degrees Celsius as threshold instead (indicating that food is completely frozen, i.e., is fresh from the freezer).
14. Scan all 768 pixels again, and choose all pixels that are below this temperature threshold as food pixels (thus including pixels that would otherwise fail to be included per the original expansion).

Other algorithms may be used to determine size information, however, so the invention is not limited to the specific algorithm presented above.

Figure 4:
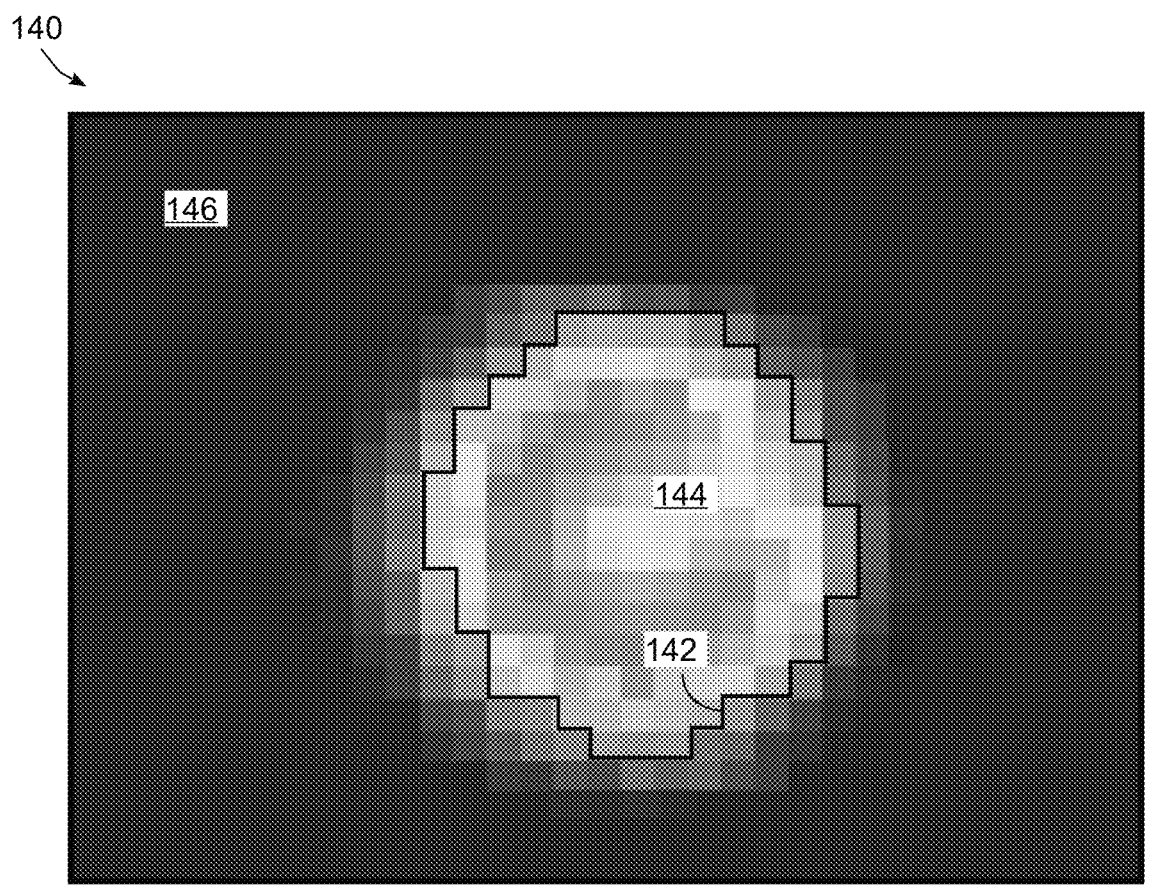
FIG. 4 illustrates an example thermal image captured by the microwave cooking appliance of FIGS. 1-2.

Now returning to block 106 of FIG. 3, the chosen pixels may be marked as food temperature readings or otherwise stored for later recall, while other coordinates or indices may be marked as non-food temperature readings or otherwise stored for later recall. Turning briefly to FIG. 4, for example, this figure illustrates an example thermal image 140 and a graphical representation of an example threshold 142 that discriminates between a region of food temperature readings 144 (lighter colors, indicating closer to freezing) and non-food temperature readings 146 (darker colors, indicating closer to room temperature).

Returning to FIG. 3, next in block 108 one or more statistics are generated from the food temperature readings, e.g., a food mean or average temperature. In some embodiments, for example, the values of all of the food temperature readings may be summed and the sum may be divided by the total number of food temperature readings.

Next, in block 110 an initial output level and initial duration for a first or initial stage of the cycle are determined. In some embodiments, these values may be determined based upon the measured food size (e.g., in terms of number of food temperature readings) and the food's initial mean temperature. In addition, given that the relative size information represented by the number of food temperature readings is somewhat imprecise due to a lack of height or thickness information, it may also be desirable, as noted above in connection with block 102, to receive a food weight and/or food type from the user (although as also noted above this block may be omitted in some embodiments). It may also be desirable, given the imprecise nature of the size information, as well as a lack of composition information about the food itself (e.g., its water content), to be conservative in terms of output level and/or duration for the initial stage. However, it is also desirable to apply enough energy to achieve sufficient temperature change so that power levels and durations for one or more subsequent stages may be calculated. It will also be appreciated that suitable mappings between food size, food initial temperature, output level and duration may be determined empirically in some embodiments. In addition, in some embodiments, the first or initial stage may use a predetermined output level and/or duration that is/are independent of the initial temperature profile data.

Duration may be controlled in a number of different manners in different embodiments. In the illustrated embodiment, for example, duration may be specified in terms of numbers of full rotations of the turntable, as it is generally desirable to stop the turntable at approximately the same rotational position whenever temperature profile data is collected, thereby enabling the size information collected in block 106 to be used to distinguish between food and non-food temperature readings in subsequent temperature profile data collection operations. In other embodiments, however, duration may be specified in other manners, e.g., seconds. Furthermore, temperature profile data may be collected from different rotational positions of a turntable in other embodiments, e.g., with the temperature readings rotated via an image processing technique such that correspondence between temperature readings between different temperature profile data collections may be established.

While other algorithms may be used, one suitable algorithm for determining output level and duration for an initial stage may be as follows:

1. Using the food size algorithm discussed above, determine the temperature threshold for food pixels.
2. If the threshold is below about 0 degrees Celsius, follow a general open-loop formula, e.g., heating at full power for 60*weight+5 seconds, but with duration calculated to a nearest whole number of rotations (e.g., about 12.65 seconds per rotation in one example design). In addition, when rounding the duration, the output level may be adjusted in some embodiments such that the total energy provided stays the same as calculated without rounding (as energy is a product of power and time).
3. If the threshold is above about 0 degrees Celsius and below about 3 degrees Celsius, decrement the number of rotations by 1.
4. If the threshold is above about 3 degrees Celsius, decrement the number of rotations by 2.

In addition, for some food types, e.g., beef patties, it may be desirable to decrease the output level, e.g., to about 90% of full power. Otherwise, it may be desirable for the purposes of later operations in the cycle to maximize output level during the initial stage to penetrate the frozen core of the food through heat conduction without overcooking the surface. Other algorithms may be used in other embodiments, however, so the invention is not limited to the specific algorithm presented above.

Returning again to FIG. 3, in block 112, the microwave power generator is energized at the determined output level and for the determined duration and turntable rotation is initiated. The duration, in some embodiments, may be about 1-3 full turntable revolutions, and if the turntable rotation rate is known, may be controlled based upon a timer and without the need for a position sensor. At the end of the duration, the microwave power generator is deenergized and the turntable is stopped.

Next, in block 114, a loop is initiated to perform one or more sensing intervals until a sensing criterion is reached, at which point a next stage of the cycle is performed. In particular, temperature profile data is collected from the temperature sensor, e.g., by capturing a thermal image, and in block 116, a number of statistics are generated from the array of thermal readings in the thermal image. Desirably, the turntable is stopped in the same position at which the initial temperature profile data was collected, so the temperature readings that correspond to food as determined in block 106 may also be used to discriminate between food and non-food temperature readings. In the illustrated embodiment, both a mean or average temperature and a standard deviation are determined for the food temperature readings (i.e., the non-food temperature readings are excluded from the calculations).

In the illustrated embodiment, the sensing criterion that must be met in order to proceed to the next stage is based upon two conditions. The first condition requires that the temperature of the food be stabilized. Given that the microwave power generator is deenergized during each sensing interval, the surface temperature of the food will naturally decrease, so this condition ensures that the temperature stabilizes before attempting to determine the control parameters for the next stage. In the illustrated embodiment, this condition is met when the rate of change of the food mean temperature (e.g., the difference between the current food mean temperature and the last sensed food mean temperature) meets a stabilized threshold (e.g., the rate of change falls below that threshold).

The second condition requires that the temperature of the food be even across a surface of the food. Doing so accommodates any hot spots that may have formed in thinner and/or higher water content regions of the food, and allows those hot spots to cool down and achieve more even thawing. In the illustrated embodiment, this condition is met when the standard deviation of the food temperature readings meets an evenness threshold (e.g., the standard deviation falls below that threshold).

Block 118 therefore determines whether both conditions are met, and if not, passes control to block 120 to wait for a next sensing interval, and then return to block 114 to capture new temperature profile data. Once both conditions have been met, however, block 118 passes control to block 122 to determine whether the completion criterion has been met. It will be appreciated that other conditions may be tested in block 118 in other embodiments. For example, in some embodiments, only one of the two conditions may be tested, while in other embodiments, other measurements or statistics derived therefrom may be used.

In block 122, the determination of whether the temperature meets the completion criterion may be used to determine when the food is sufficiently defrosted. While other criteria may be used in other embodiments, in the illustrated embodiment, the completion criterion may be based on a derivative of (i.e., a rate of change) of the temperature curve, given that the temperature curve generally has a "knee" at the freezing point that causes the temperature to hold at about 0 degrees Celsius while sufficient energy is applied to phase change the water from ice to the liquid state. In other embodiments, the completion criterion may be based on other factors, e.g., the mean temperature being at or above a threshold temperature such as between about 0 and about 10 degrees Celsius. In addition, in some embodiments, a completion criterion may also be based at least in part on the detection of any hot spots, e.g., any hot spot with a temperature of greater than about 25 degrees Celsius, or any hot spot "cluster" of multiple temperatures greater than a lower temperature, e.g., about 22 degrees Celsius.

If the criterion is met, control may pass to block 124 to report the completion of the cycle to the user (e.g., via the display and/or via an audible alert), and the cycle is complete. Returning to block 122, however, if the completion criterion is not met, control passes to block 126 to determine an output level and a duration for the next stage of the cycle. In this operation, the temperature profile data collected in block 114 and the statistics determined in block 116 may be used, and in some embodiments, the initial temperature profile data collected in block 104, the initial food size and mean temperature determined in blocks 106 and 108, and/or the food weight received in block 102 may also be used. In particular, in addition to a food size as determined in block 106 and the current food mean temperature as determined in block 116, the average temperature change of the food after applying the initial defrost energy can also be determined by taking the difference between the current food mean temperature of block 116 and the initial food mean temperature of block 108. From this data, a water mass of the food may be estimated, e.g., based upon correlations generated from empirical testing, and from the water mass (or alternatively, directly from the data used to determine the water mass), a remaining duration for the cycle may be determined and reported to the user (e.g., via the display and/or an audible alert) in block 126. In some embodiments, for example, the determined temperature change may be used to extrapolate a number of stages and/or duration remaining to reach the completion criterion. Then, in block 128, an output level and duration (e.g., in terms of full revolutions of the turntable) for the next stage of the cycle may be determined in a similar manner to block 110, but also with knowledge of the water mass and/or temperature difference determined in block 126. Control then returns to block 112 to initiate the next stage and re-energize the microwave power at the newly-determined output level and for the newly-determined duration.

Estimating a remaining duration in some embodiments may be based on a desired completion criterion of achieving an average surface temperature of about 3 to about 4 degrees Celsius without any hot spots. It may be assumed, for example, in some embodiments that once the average surface temperature gets to about 4 degrees Celsius it should only take another 3 to 4 rotations at a comparatively low output level (e.g., power level 3 in one example embodiment) for the completion criterion to be met. These last 3 to 4 rotations may not be continuous, but may include pauses between each rotation (e.g., about 15 seconds). Thus, assuming a rotation duration of about 12.65 seconds, the remaining duration would be about (12.65+15)*3 or 4 rotations after the initial stage in some embodiments. Further, if the development of hot spots is detected, the estimation may be adjusted, e.g., by assuming that pauses of about 10 seconds will be added between each rotation and that the output level will be decreased to a lower level (e.g., power level 3 in one example embodiment). Other algorithms may be used in other embodiments, however, so the invention is not limited to the specific algorithm presented above.

As such, a defrost cycle may include one or more additional stages beyond the initial stage. Moreover, in different embodiments, the temperature change determined and used in connection with blocks 126 and 128 for subsequent stages beyond the second stage may still be based upon a difference between a current temperature and the initial temperature, while in other embodiments, the temperature change may be based upon a difference between the current temperature and the temperature determined in another stage subsequent to the initial stage.

It will be appreciated that various additional modifications may be made to the embodiments discussed herein, and that a number of the concepts disclosed herein may be used in combination with one another or may be used separately. Therefore, the invention lies in the claims hereinafter appended.

What is claimed is:

1. A microwave cooking appliance, comprising:
   an enclosure including a singular cooking cavity configured to receive food;
   a microwave power generator configured to generate microwave energy for heating the food received in the singular cooking cavity;
   a temperature sensor configured to sense temperature within the singular cooking cavity; and
   a controller coupled to the microwave power generator and the temperature sensor and configured to perform a cycle to heat the food received in the singular cooking cavity, wherein the controller is configured to perform the cycle by:
      performing a first stage of the cycle by controlling the microwave power generator to heat the food;
      after the first stage of the cycle, maintaining the microwave power generator deenergized for a first duration;
      determining a temperature profile of the food using the temperature sensor after the first stage of the cycle is complete and while the microwave power generator is deenergized, wherein the controller is configured to determine the temperature profile of the food using the temperature sensor by sensing a temperature at a plurality of sensing intervals during the first duration while the microwave power generator is deenergized and the food is not being heated within the singular cooking cavity, and wherein the controller is further configured to sense the temperature at the plurality of sensing intervals until determining that a sensing criterion is met;
      after the first stage of the cycle is complete, waiting until the sensing criterion is determined to be met to determine whether the temperature profile meets a completion criterion for the cycle;
      in response to determining that the temperature profile meets the completion criterion for the cycle, terminating the cycle; and
      in response to determining that the temperature profile fails to meet the completion criterion for the cycle, performing a second stage of the cycle by determining a duration for the second stage and an output level for the microwave power generator during the second stage and controlling the microwave power generator to heat the food at the determined output level and for the determined duration.

2. The microwave cooking appliance of claim 1, wherein the cycle is a defrost cycle.

3. The microwave cooking appliance of claim 2, wherein the cycle is an auto-defrost cycle, and wherein the controller is configured to initiate the auto-defrost cycle in response to selection of an auto-defrost control.

4. The microwave cooking appliance of claim 3, wherein the controller is further configured to receive user input of a food weight, and in response to the user input, control at least one of a power level and a duration of the first stage of the cycle based in part on the user input.

5. The microwave cooking appliance of claim 1, wherein the microwave power generator is a variable power microwave power generator, and wherein the controller is configured to control the microwave power generator to heat the food at the determined output level by varying an output power of the microwave power generator.

6. The microwave cooking appliance of claim 1, wherein the microwave power generator is a fixed power microwave power generator, and wherein the controller is configured to control the microwave power generator to heat the food at the determined output level by cycling the microwave power generator.

7. The microwave cooking appliance of claim 1, wherein the temperature sensor comprises a non-contact infrared thermal sensor.

8. The microwave cooking appliance of claim 1, wherein the temperature sensor comprises a thermal camera configured to generate a thermal image having an array of temperature readings over a field of view thereof.

9. The microwave cooking appliance of claim 1, wherein the controller is further configured to determine an initial temperature profile of the food using the temperature sensor and prior to initiating the first stage.

10. The microwave cooking appliance of claim 9, wherein the initial temperature profile incudes a thermal image including an array of temperature readings over a field of view thereof, and wherein the controller is configured to determine a size of the food by applying a threshold to the array of temperature readings.

11. The microwave cooking appliance of claim 9, wherein the initial temperature profile incudes a first thermal image including a first array of temperature readings over a field of view thereof, and wherein the controller is configured to determine a size of the food by:
   determining a knee point from the first array of temperature readings;
   determining a first set of food temperature readings from among the first array of temperature readings based upon the determined knee point;
   expanding the first set of food temperature readings to include one or more adjacent temperature readings from the first array of temperature readings;
   determining a temperature threshold from the expanded first set of food temperature readings;
   capturing a second thermal image including a second array of temperature readings; and
   determining a second set of food temperature readings from among the second array of temperature readings based upon the determined temperature threshold.

12. The microwave cooking appliance of claim 9, wherein the controller is configured to determine a duration for the first stage and an output level for the microwave power generator during the first stage based at least in part on the initial temperature profile.

13. The microwave cooking appliance of claim 12, further comprising a rotatable turntable, and wherein at least one of the duration of the first stage and the duration of the second stage is based upon a number of turntable rotations.

14. The microwave cooking appliance of claim 1, wherein the controller is configured to determine that the sensing criterion is met at least in response to determining that a temperature of the food stabilizes.

15. The microwave cooking appliance of claim 14, wherein the controller is configured to determine when the temperature of the food stabilizes by determining when a rate of change of the temperature meets a threshold.

16. The microwave cooking appliance of claim 1, wherein the controller is configured to determine that the sensing criterion is met at least in response to determining that a temperature of the food is even across a surface of the food.

17. The microwave cooking appliance of claim 16, wherein the controller is configured to determine when the temperature of the food is even across the surface of the food by determining when a standard deviation of a plurality of temperature measurements across the surface of the food meets a threshold.

18. The microwave cooking appliance of claim 1, wherein the controller is configured to determine that the temperature profile meets the completion criterion for the cycle when a temperature of the food reaches a threshold temperature.

19. The microwave cooking appliance of claim 1, wherein the controller is further configured to estimate a remaining duration of the cycle based at least in part on the temperature profile and report the remaining duration to a user.

20. The microwave cooking appliance of claim 19, wherein the controller is configured to estimate a remaining duration of the cycle by determining a water mass of the food based at least in part on the temperature profile and an initial temperature profile determined using the temperature sensor and prior to initiating the first stage.

21. A microwave cooking appliance, comprising:
   an enclosure including a singular cooking cavity configured to receive food;
   a microwave power generator configured to generate microwave energy for heating the food received in the singular cooking cavity;
   a temperature sensor configured to sense temperature within the singular cooking cavity; and
   a controller coupled to the microwave power generator and the temperature sensor and configured to perform a defrost cycle to defrost the food received in the singular cooking cavity, wherein the controller is configured to:
      determine a first temperature profile of the food using the temperature sensor;
      perform a first stage of the defrost cycle after determining the first temperature profile by controlling the microwave power generator to heat the food;
      after the first stage of the cycle, maintaining the microwave power generator deenergized for a first duration;
      determine a second temperature profile of the food using the temperature sensor after the first stage of the defrost cycle is complete, wherein the controller is configured to determine the second temperature profile of the food using the temperature sensor by sensing a temperature at a plurality of sensing intervals during the first duration while the microwave power generator is deenergized and the food is not being heated within the singular cooking cavity, and wherein the controller is further configured to sense the temperature at the plurality of sensing intervals until determining that a sensing criterion is met;
      after the first stage of the cycle is complete, waiting until the sensing criterion is determined to be met to estimate a remaining duration of the defrost cycle based at least in part on the first and second temperature profiles; and
      report the remaining duration to a user.

22. The microwave cooking appliance of claim 21, wherein the controller is configured to estimate the remaining duration of the defrost cycle based at least in part on the first and second temperature profiles by determining a water mass of the food based at least in part on the first and second temperature profiles.

23. The microwave cooking appliance of claim 21, wherein the controller is configured to perform a second stage of the defrost cycle by determining a duration for the second stage and an output level for the microwave power generator during the second stage and controlling the microwave power generator to heat the food at the determined output level and for the determined duration.

24. The microwave cooking appliance of claim 21, wherein the controller is configured to determine a duration for the first stage and an output level for the microwave power generator during the first stage based at least in part on the first temperature profile.

25. A method of performing a cycle to heat food disposed in a singular cooking cavity of a microwave cooking appliance, the method comprising:

performing a first stage of the cycle by controlling a microwave power generator to generate microwave energy to heat the food disposed in the singular cooking cavity of the microwave cooking appliance;

after the first stage of the cycle, maintaining the microwave power generator deenergized for a first duration;

determining a temperature profile of the food using a temperature sensor configured to sense temperature within the singular cooking cavity after the first stage of the cycle is complete and while the microwave power generator is deenergized, wherein determining the temperature profile of the food using the temperature sensor includes sensing a temperature at a plurality of sensing intervals during the first duration while the microwave power generator is deenergized and the food is not being heated within the singular cooking cavity, and wherein sensing the temperature at the plurality of sensing intervals is performed until determining that a sensing criterion is met;

after the first stage of the cycle is complete, waiting until the sensing criterion is determined to be met to determine whether the temperature profile meets a completion criterion for the cycle;

in response to determining that the temperature profile meets the completion criterion for the cycle, terminating the cycle; and in response to determining that the temperature profile fails to meet the completion criterion for the cycle, performing a second stage of the cycle by determining a duration for the second stage and an output level for the microwave power generator during the second stage and controlling the microwave power generator to heat the food at the determined output level and for the determined duration.

26. The microwave cooking appliance of claim 1, wherein the controller is further configured to, during a first sensing interval of the plurality of sensing intervals:

determine that the sensing criterion is not met by determining that a temperature of the food is not stabilized and/or that a temperature of the food is not even across a surface of the food; and in response to determining that the sensing criterion is not met, perform a second sensing interval of the plurality of sensing intervals.

* * * * *